Feb. 26, 1952 W. R. PAULSEN 2,587,375
ATMOSPHERIC PRESSURE REGULATOR
Filed May 17, 1945 2 SHEETS—SHEET 1
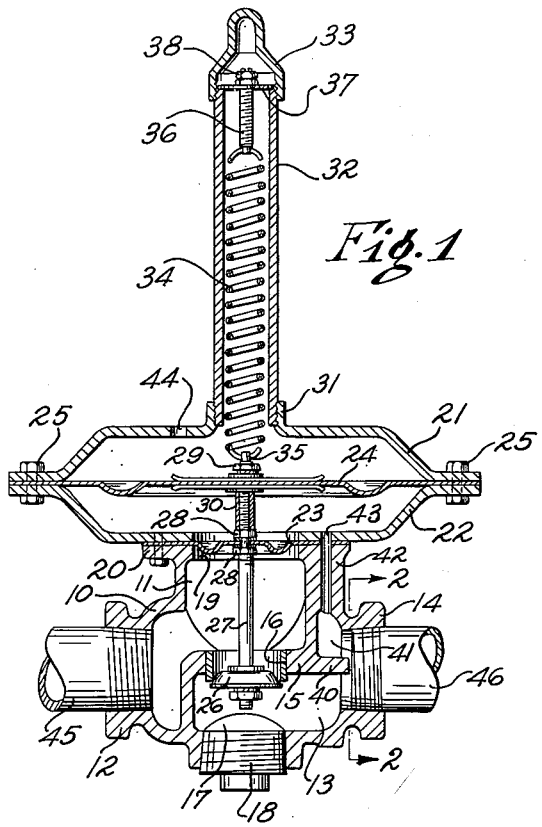
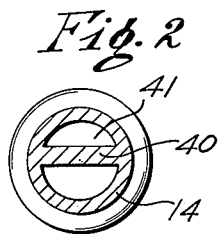
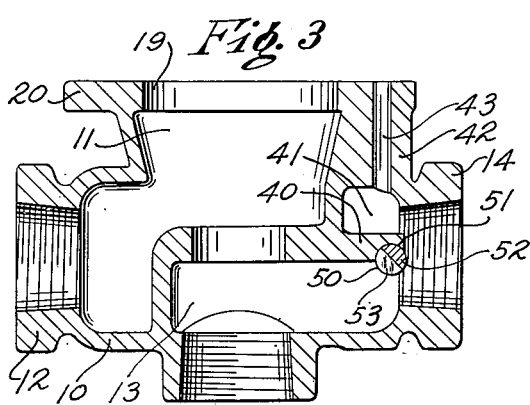
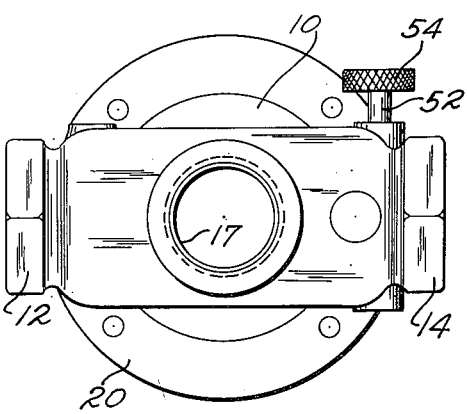
INVENTOR.
WILLIAM R. PAULSEN
BY Richey & Watts
ATTORNEYS Feb. 26, 1952 W. R. PAULSEN 2,587,375
ATMOSPHERIC PRESSURE REGULATOR
Filed May 17, 1945 2 SHEETS—SHEET 2
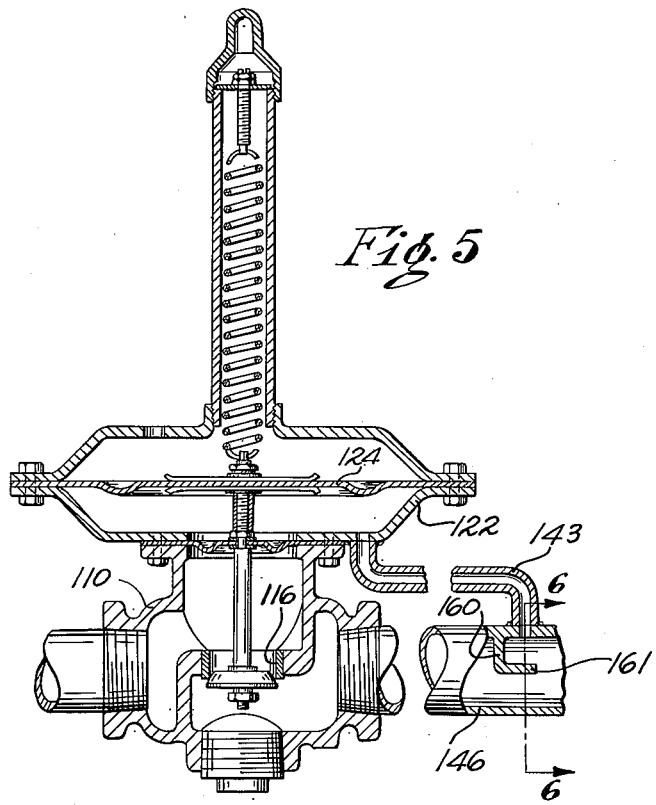
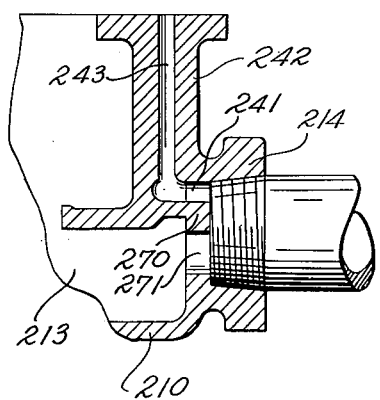
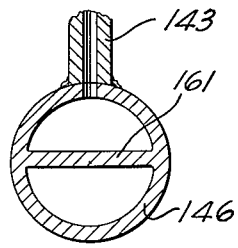
INVENTOR.
WILLIAM R. PAULSEN
BY *Richey & Watts*
ATTORNEYS Patented Feb. 26, 1952

2,587,375

UNITED STATES PATENT OFFICE 2,587,375

ATMOSPHERIC PRESSURE REGULATOR

William R. Paulsen, Cleveland, Ohio

Application May 17, 1945, Serial No. 594,337

2 Claims. (Cl. 50—23)

This invention relates to pressure regulating valves.

The principal object of this invention is to regulate the pressure of a flowing fluid at a desired point so as to maintain the pressure substantially uniform, irrespective of variations in inlet pressure and irrespective of variations in the rate of flow throughout the entire range of rate of flow which may be accommodated by the size of the particular conduits in which the pressure is being controlled.

Another object of this invention is to regulate the pressure of a fluid, particularly a gas, by substantially balancing the inlet pressure and controlling the size of the orifice through which the fluid is permitted to escape into the delivery passage by a force which is a function both of the static pressure in the delivery passage and the velocity of the fluid flowing therethrough. Other objects are to deliver gas at an accurately regulated pressure at or below atmospheric pressure from a supply of relatively high pressure; to vary the location of the point in the outlet conduit at which the required pressure of the delivered fluid is maintained; to vary the relation between the effect of static pressure and the effect of the velocity of the delivered fluid on the regulating valve; and to improve and simplify the construction and facilitate the manufacture, installation and service of a valve of this type. Other objects relating to details of construction and economies of manufacture will appear hereafter.

In the accompanying drawings which illustrate preferred embodiments of the present invention:

Fig. 1 is a cross section through a regulating valve embodying the present invention in which the desired outlet pressure is maintained in the region of the outlet port of the valve;

Fig. 2 is a section taken on the line 2—2 of Fig. 1;

Fig. 3 is a section through the valve housing or body member of a slightly modified form in which means are provided to vary the relation between the effect of static pressure and the effect of velocity on the regulating diaphragm;

Fig. 4 is a bottom plan view of the valve shown in Fig. 3;

Fig. 5 is a cross section through a valve similar to that shown in Fig. 1 in which the desired pressure is maintained at a point in the outlet conduit remote from the valve itself;

Fig. 6 is a detailed section taken on the line 6—6 of Fig. 5; and

Fig. 7 is a cross section through a portion of the housing of a valve similar to that shown in Fig. 1 showing a slight modification in construction.

Referring to the drawings, the regulating valve shown in Figs. 1 and 2 includes a valve body member 10 which is preferably a casting and which is formed with an inlet pressure chamber 11 communicating with an inlet connection 12, an outlet chamber 13 communicating with an outlet connection 14 and a wall 15 separating the inlet and outlet chambers 11 and 13. The wall 15 is bored and provided with a valve seat 16. The bottom wall of the outlet chamber 13 is bored and tapped to provide an access opening 17 normally closed by a plug 18.

The upper wall of the inlet chamber 11 is formed with a bore 19 substantially coaxial with the valve seat 16 and surrounded by an attaching flange 20. A diaphragm chamber consisting of upper and lower members 21 and 22 is secured to the flange by bolts or the like with a sealing diaphragm 23 clamped between the lower surface of the member 22 and the upper surface of the flange 20. The peripheral portion of an actuating diaphragm 24 is clamped between the upper and lower portions 21 and 22, forming the diaphragm chamber, which are secured together by bolts or the like 25.

A valve closure member 26 is disposed in the outlet chamber 13 and is arranged to engage the seat 16 to seal the inlet chamber from the outlet chamber. The closure member 26 is secured to a valve stem 27 which projects upwardly through central openings in the sealing diaphragm 23 and the actuating diaphragm 24. The sealing diaphragm 23 is clamped and sealed to the valve stem 27 in any suitable way as by nuts 28 engaging opposite sides of the diaphragm and similarly is clamped to the actuating diaphragm 24 in any suitable way as by a nut 29 and a sleeve 30.

The upper member 21 of the diaphragm chamber is formed with a central opening surrounded by a flange 31 to which is secured a spring housing tube 32 which projects upwardly and is closed in its upper end by a cap 33. A tension spring 34 has its lower end connected to the upper end of the valve stem 27 as indicated at 35 and has its upper end connected to the lower end of an adjusting screw 36. The adjusting screw 36 extends through a washer 37 supported on the upper end of the tube 32 and is held in adjusted position by nuts 38 accessible by removal of the cap 33 to adjust the tension of the springs 34.

The dividing wall 15 in the valve body is formed with an extension 40 projecting laterally substantially into the inner end of the outlet connection 14. A space 41 communicating with the outlet connection 14 is formed above the extension 40 preferably by coring the same out during the casting of the valve body. Thus the extension 40 forms a baffle or dividing wall extending across and dividing the outlet connection 14 as shown in Fig. 2. The valve body is formed with a thickened portion 42 extended above the space 41 to the flange 20 and a passage 43 is drilled through the lower member 22 of the diaphragm chamber, through the sealing diaphragm 23, and through the enlargement 42 into the space 41, so as to provide communication between the space 41 and the under side of the actuating diaphragm 24.

The sealing diaphragm 23 and the actuating diaphragm 24 are preferably made of relatively soft substantially impervious material, such as leather or the like. The chamber between the lower member 22 and the under side of the actuating diaphragm 24 is preferably sealed except for the passage 43 to the chamber 41. The chamber between the upper member 21 and the upper side of the actuating diaphragm 24 is placed in communication with a source of actuating pressure. Ordinarily the actuating pressure is atmosphere and for this purpose the member 21 may be formed with a small bore 44 opening to the atmosphere or any other suitable connection.

A pipe 45 leading from any suitable source of gas under pressure is connected to the inlet connection 12 and a discharge pipe 46 is connected to the outlet connection 14. In the preferred arrangement of the structure illustrated in Figs. 1 and 2, the valve is arranged to maintain a pressure at or slightly below atmospheric pressure at the desired point in the pipe 46. The discharge pipe 46 may lead, for example, to an aspirating gas burner, or the like, in which air under pressure is allowed to escape past the end of a pipe communicating with the discharge pipe 46 creating an aspirating effect tending to draw gas through the discharge pipe 46 in accordance with the amount of air admitted to the burner.

For uses of this type, the tension of the spring 34 is adjusted to substantially balance the weight of the valve stem 27, the valve closure 26, and their associated parts. The sealing diaphragm 23 is preferably slightly larger in effective area than the upper face of the valve closure 26 exposed to the inlet pressure so that the inlet pressure is substantially balanced but with a slight bias of the valve toward closed position, so as to insure closing of the valve in the event of a break in the discharge line, or when aspiration of the gas from the discharge pipe 46 stops for any reason. The actuating diaphragm 24 is of substantial area with respect to the area of the valve port 16 and the inlet and outlet pipes 45 and 46 so as to provide a sensitive operation and minimize as far as possible the effects of friction and the like. For example, in a 1½ inch valve, in which the inside diameter of each of the pipes 45 and 46 is 1½ inches and similarly the diameter of the valve port 16 is 1½ inches, the outside diameter of the actuating diaphragm 24 is preferably made about twelve inches.

When gas is aspirated or otherwise drawn from the discharge pipe 46, the static pressure in the pipe 46 and in the chamber 41 begins to drop. The pressure in the chamber between the under side of the diaphragm 24 and the member 22 is correspondingly reduced through the hole 43, so that the pressure existing on the upper side of the diaphragm moves the valve stem 27 downwardly, opening the valve and permitting gas to flow from the inlet chamber 11, past the valve closure 26, into the outlet chamber 13, and thence into the discharge pipe 46. So long as the demand is small, so that the velocity of the gas moving through the discharge chamber 13 and the discharge pipe 46 remains low, the valve closure 26 opens but a small amount and the valve continues to operate substantially in accordance with static pressure variations in the outlet pipe. The diameters of the valve seat, the sealing diaphragm and the actuating diaphragm are initially selected, and the tension of the spring 34 is adjusted, to give the desired performance when the valve has just commenced to open and the actuating diaphragm is operating in response to the static pressure on the discharge side.

When the demand increases, so that the valve 26 must move farther away from the seat 16 in order to permit sufficient flow of gas through the valve to satisfy the demand, the effect of the inlet pressure on the valve closure member 26 and on the sealing diaphragm 23 changes. When the valve is closed and when it has just begun to open the upper face of the valve closure member 26 is subjected to the static pressure existing in the inlet chamber 11. As soon as the valve moves farther open the upper face of the valve closure member 26 moves farther into the relatively low pressure existing in the outlet chamber 13 and is no longer subjected to the full static inlet pressure. This reduction in static pressure applied to the face of the valve is partially offset by an increase of the impingement force of the rapidly flowing gas against the upper face of the closure member 26. At the same time the diaphragm 23 begins to assume a somewhat conical shape and the effect of the inlet pressure on the diaphragm 23 is therefore modified. Also as the valve opens the tension of the spring 34 increases slightly. The net result of all of these variations is a rapid decrease in the outlet pressure as the rate of flow increases.

By the present invention this decrease in the forces tending to open the valve with an increase in flow is compensated by the arrangement of the baffle wall 40, the chamber 41 and the passage 43. The baffle wall 40 reduces the area of the outlet connection 14 so as to increase the velocity of the gas moving from the outlet chamber 13 into the discharge pipe 46. In a 1½ inch valve with the dimensions given above, the baffle wall 40 is arranged so as to reduce the effective area of the passage between the outlet chamber 13 and the pipe 46 to about one-half the cross sectional area of the pipe 46. Ordinarily, as pointed out above, the valve port is made the same size as the outlet pipe, so that in such cases the restricted passage formed by the wall 40 is also about one-half the area of the valve port. Thus the velocity of the gas passing through this point is substantially increased with a corresponding reduction in pressure in the chamber 41 which is transmitted through the passage 43 to the chamber between the member 22 and the underside of the diaphragm 24. It is found that this additional reduction from the static pressure balances the variations of the action of the gas against the valve closure 26 and the sealing diaphragm 23 so that the valve continues to operate to deliver gas at the same pressure throughout the full range of flow which can be accommodated by the 1½ inch outlet pipe. Thus the valve is directly responsive to a given outlet pressure throughout the full range of variation in the rate of flow.

In the modification shown in Figs. 3 and 4, the construction is the same as that shown in Fig. 1 except that an adjustable vane-member is mounted in the baffle to vary its effective restriction. To effect this adjustment, a small hole 50 is drilled transversely through the inner end of the outlet connection 14 so that a semi-cylindrical recess 51 is formed in the underside of the baffle wall 40 at its free end. A rod 52 is journalled in the hole 50 and is cut away to a plane through its axis on one side as indicated at 53. One end of the rod 52 projects from the valve body 10 and is provided with an operating handle 54. When the rod 50 is turned to one position its plane surface 53 is aligned with and forms a continuation of the lower surface of the baffle wall 40, so that the construction is the same as that shown in Fig. 1. By rotating the rod 52 from this position the solid semi-cylindrical portion of the rod is caused to extend downwardly below the lower surface of the baffle wall 40 as shown in Fig. 3, thereby reducing the area of the opening between the outlet chamber 13 and the outlet connection 14. This reduction in the area at this point further increases the velocity of the gas moving from the outlet chamber 13 into the outlet pipe, thus providing a greater reduction of pressure in the chamber 41 for a given increase in the rate of flow. This arrangement is particularly suitable for valves to be used under different conditions where the amount of additional pressure reduction to counterbalance the loss of opening pressure on the valve with increased flow needs to be varied.

The valve shown in Figs. 5 and 6 is substantially the same as that shown in Figs. 1 and 2 except that the restriction in the outlet line to increase the velocity, and the connection to the diaphragm chamber, are located at any desired point in the outlet conduit more or less remote from the valve itself. The enlargement 42, passageway 43 and baffle wall 40 of the valve shown in Fig. 1 are omitted from the valve body 110. At the desired point, which may be any distance from the valve itself, the outlet pipe 146 is formed internally with a restriction. In the illustrated embodiment the restriction is formed by a radial wall member 160 having an axially extending lip 161, the bottom surface of the lip 161 being located near the center of the pipe 146 so as to reduce the cross sectional area of the pipe below the lip 161 to about one half the cross sectional area of the outlet pipe 146. A tube 143 is connected to the pipe 146 and opens into the same on the down stream side of the radial wall 160 and above the lip 161. The other end of the tube is connected to the diaphragm housing member 122 and opens into the chamber formed between the member 122 and the underside of the actuating diaphragm 124. The operation of this form is the same as the operation of the valve shown in Fig. 1, the only difference being that the point at which the controlled pressure is maintained is located in the pipe 146 immediately beyond the lip 161.

In the form of the valve shown in Fig. 7 the restriction is formed in the entrance end of the outlet connection 214 by an annular wall 270 integral with the valve body member 210. A hole 243 is bored through the enlargement 242 into an intersecting hole 241 bored through the wall 270. A hole 271 is bored through the wall 270 to establish communication between the outlet chamber 213 and the outlet connection 214. The hole 243 communicates with the chamber on the underside of the actuating diaphragm, as in the construction shown in Fig. 1. As in the embodiments previously described the cross sectional area of the aperture 271 in the wall 270 is smaller than the cross sectional area of the outlet pipe and for a valve with the dimensions given above is about one-half the area of the outlet pipe 246. The operation of the valve shown in Fig. 7 is the same as that of the valve shown in Fig. 1, the only difference being in the manner of providing the restriction in the outlet passage.

Although preferred forms of the invention have been described in considerable detail it will be understood that various changes and modifications may be made therein without departing from the scope of the invention as defined in the following claims. For example, the construction of the restricted area in the outlet passageway as shown in Fig. 7 may be used to provide the restricted orifice at a remote point in accordance with the arrangement shown in Figs. 5 and 6. Similarly the adjustable feature illustrated in Figs. 3 and 4 may be incorporated in any of the other forms of the valve. Many other changes may likewise be made.

I claim:

1. In a pressure regulating valve, a hollow body having an internal wall dividing said body into inlet and outlet chambers, an inlet port in said body for said inlet chamber, an outlet port for said outlet chamber, said wall having a mid-section disposed substantially along the axis of said outlet port and merging with a terminal section adjacent to and extending partially across said outlet port, said mid-section being formed with a valve port, a valve closure member arranged to close said valve port and to move into said outlet chamber to open said valve port, a valve stem connected to said closure member, an actuating diaphragm operatively connected to said stem means on one side of said diaphragm for exerting a force to open said valve, a housing enclosing the other side of said diaphragm forming therewith a control chamber, a dividing baffle projecting integrally from the mid-section of said wall and extending substantially along the axis of said outlet port, said projecting baffle being substantially flat and extending from side to side across said port and forming with said terminal wall section and the adjacent body walls a static pressure pocket, and a conduit in said body communicating with said static pocket and with said control chamber.

2. In a pressure regulating valve, a hollow body having an internal wall dividing said body into inlet and outlet chambers, an inlet port in said body for said inlet chamber, an outlet port for said outlet chamber, said wall having a mid-section disposed substantially along the axis of said outlet port and merging with a terminal section adjacent to and extending partially across said outlet port, said mid-section being formed with a valve port, a valve closure member arranged to close said valve port and to move into said outlet chamber to open said valve port, a valve stem connected to said closure member, an actuating diaphragm operatively connected to said stem means on one side of said diaphragm for exerting a force to open said valve, a housing enclosing the other side of said diaphragm forming therewith a control chamber, a dividing baffle projecting integrally from the mid-section of said wall and extending substantially along the axis of said outlet port, said projecting baffle being substantially flat and extending from side to side across said port and forming with said terminal wall section and the adjacent body walls a static pressure pocket, a conduit in said body communicating with said static pocket and with said control chamber, and means to adjust the restriction of said baffle comprising a rod rotatably mounted in the walls of said body and extending across the free end portion of said baffle, said rod adjacent said baffle having a vane portion rotatable to one position wherein the restriction of the baffle is not increased, and to another position to increase said restriction.

WILLIAM R. PAULSEN.

REFERENCES CITED

The following references are of record in the file of this patent:

UNITED STATES PATENTS

| Number | Name | Date |
|---|---|---|
| 1,950,121 | McKee | Mar. 6, 1934 |
| 2,106,234 | Hughes | Oct. 1, 1935 |
| 2,137,025 | Niesemann | Nov. 15, 1938 |
| 2,305,975 | McKinley | Dec. 22, 1942 |

FOREIGN PATENTS

| Number | Country | Date |
|---|---|---|
| 4,930 | Great Britain | Feb. 25, 1914 |
| 49,109 | Norway | Dec. 31, 1921 |
| 447,605 | Germany | July 28, 1927 |
| 616,061 | Germany | July 19, 1927 |